(12) United States Patent
Higaki et al.

(10) Patent No.: US 7,254,253 B2
(45) Date of Patent: Aug. 7, 2007

(54) MOVING OBJECT DETECTION SYSTEM

(75) Inventors: Nobuo Higaki, Wako (JP); Takamichi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 684 days.

(21) Appl. No.: 10/808,327

(22) Filed: Mar. 25, 2004

(65) Prior Publication Data

US 2004/0190752 A1    Sep. 30, 2004

(30) Foreign Application Priority Data

Mar. 31, 2003    (JP)    ............................. 2003-095483

(51) Int. Cl.
*G06K 9/00*    (2006.01)
(52) U.S. Cl. .................................... 382/103
(58) Field of Classification Search ................ 382/103, 382/107, 154
See application file for complete search history.

(56) References Cited

U.S. PATENT DOCUMENTS 5,845,006 A * 12/1998 Sumi et al. ................. 382/154
6,370,261 B1 * 4/2002 Hanawa ....................... 382/104
6,411,326 B1 * 6/2002 Tabata ........................... 348/47

FOREIGN PATENT DOCUMENTS

JP    06-138137    5/1994
JP    2002-326173    11/2002

* cited by examiner

*Primary Examiner*—Matthew C. Bella
*Assistant Examiner*—Tom Y. Lu
(74) *Attorney, Agent, or Firm*—Squire, Sanders & Dempsey L.L.P.

(57) ABSTRACT

In a moving object detection system, an edge image is generated from captured images taken by CCD cameras and a moving object distance image indicative of a distance to a moving object (such as a human being) is generated by extracting pixel corresponding thereto. Then, pixels in the moving object distance image are summed to generate a histogram and a profile extraction region is set in the moving object distance image with its center line focusing on a position whose histogram is greatest, while the edge image is superposed on the moving object distance image to correct the center line of the profile extraction region such that the moving object is detected by extracting its profile in the region. With this, it becomes possible to detect the moving objects respectively even when the two or more objects are present in neighborhood.

12 Claims, 8 Drawing Sheets

MOVING OBJECT DETECTION SYSTEM

BACKGROUND OF THE INVENTION

1. Field of the Invention

This invention relates to a moving object detection system, particularly to a moving object detection system that detects moving objects such as obstacles and human beings from captured images.

2. Description of the Related Art

One known moving object detection system that detects moving objects based on captured images is described in Japanese Laid-Open Patent Application No. Hei 6 (1994)-138137 (see paragraphs. 0035-0039, for example). The system taught by this publication calculates a difference between images captured in time series and detects a region whose brightness changes as a moving object. It then extracts a partial profile of the moving object by dividing the region into sub regions, and extracts an entire profile of the moving object from the divided partial profile.

However, since the system calculates the difference between images captured in time series and detects the region whose brightness changes as a moving object, when two or more moving objects exists in neighborhood, the system may erroneously detect the adjoining objects as a single moving object.

SUMMARY OF THE INVENTION

An aspect of this invention is therefore to overcome the foregoing drawback by providing a moving object detection system that can accurately detect each moving object even when two or more moving objects exist in neighborhood.

According to this invention, there is provided a system for detecting a moving object, comprising: a plurality of cameras capturing stereoscopic image successively in time series; distance image generator inputting the images captured in time series and generating a distance image indicative of a distance to an imaged object based on a parallax of the inputted images; difference image generator inputting the images captured in time series and generating a difference image between the inputted images; edge image generator inputting the images captured in time series and generating an edge image by extracting pixels where change in brightness are equal to or greater than a predetermined level; moving object distance setting unit inputting the generated distance image and the difference image and setting a moving object distance indicative of a distance to a position where the moving object is estimated to be present, based on the inputted distance image and the difference image; moving object distance image generator inputting at least the generated edge image and the set moving object distance and generating a moving object distance image by extracting pixels corresponding to the set moving object distance from the generated edge image; profile extraction region setting unit inputting at least the generated moving object distance image and summing number of pixels in the inputted moving object distance image to set a profile extraction region, where extraction of the moving object is to be conducted, in the generated moving object distance image by defining a position, where the summed number of pixels is greatest, as its center line; center line corrector inputting at least the edge image and the defined center line of the profile extraction region and correcting the center line of the profile extraction region based on the inputted edge image; and moving object detector inputting the profile extraction region whose center line is corrected and extracting a profile of the moving object in the inputted profile extraction region to detect the moving object.

BRIEF DESCRIPTION OF THE DRAWINGS

The above and other aspects and advantages of the invention will be more apparent from the following description and drawings, in which.

DETAILED DESCRIPTION OF THE PREFERRED EMBODIMENT

A moving object detection system according to an embodiment of this invention will now be explained with reference to the attached drawings.

In the embodiment, the moving object detection system will be explained taking an example where the system is mounted on a biped robot.

Figure 1:
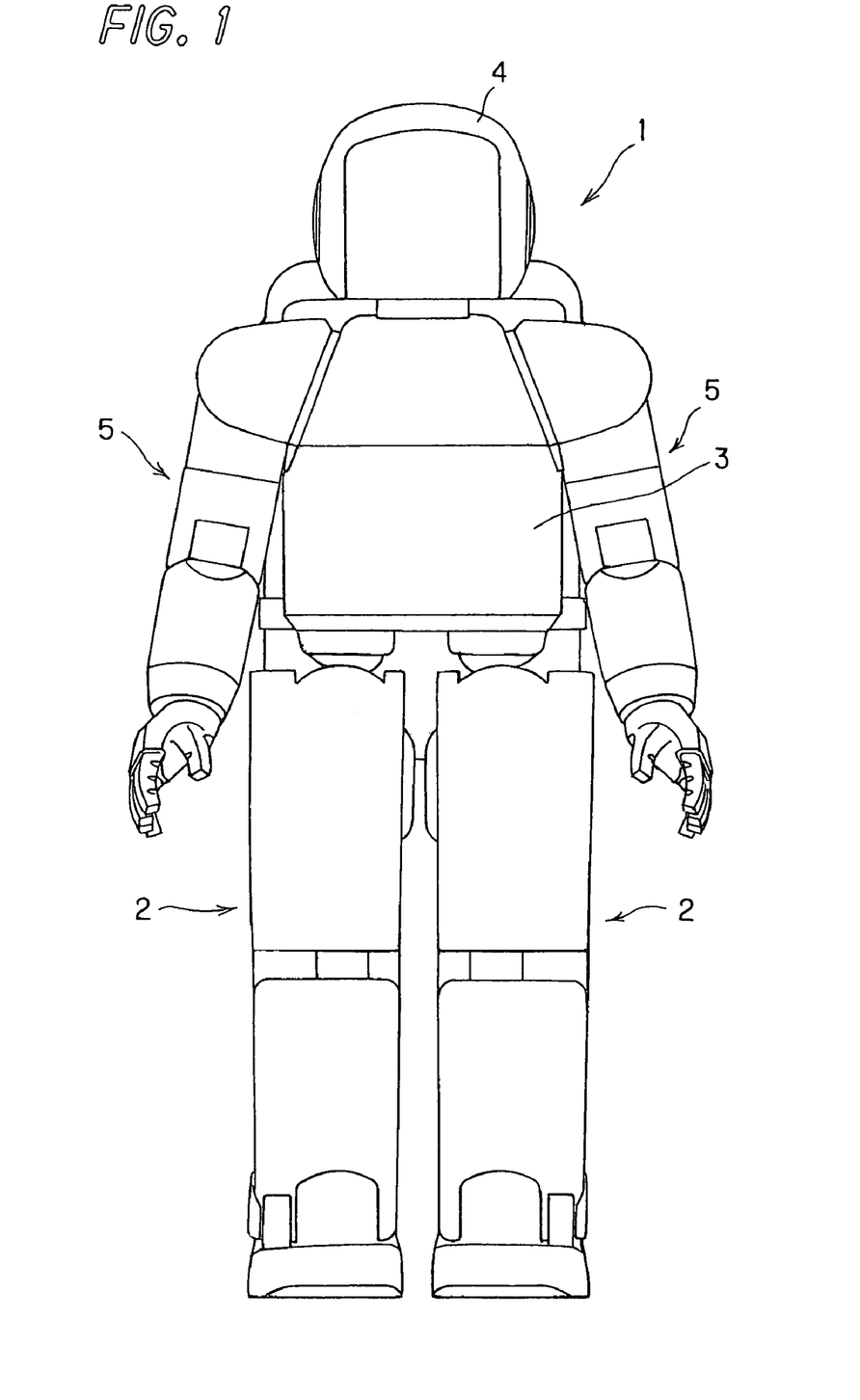
FIG. 1 is a front view of a biped robot equipped with a moving object detection system according to an embodiment of this invention.
Figure 2:
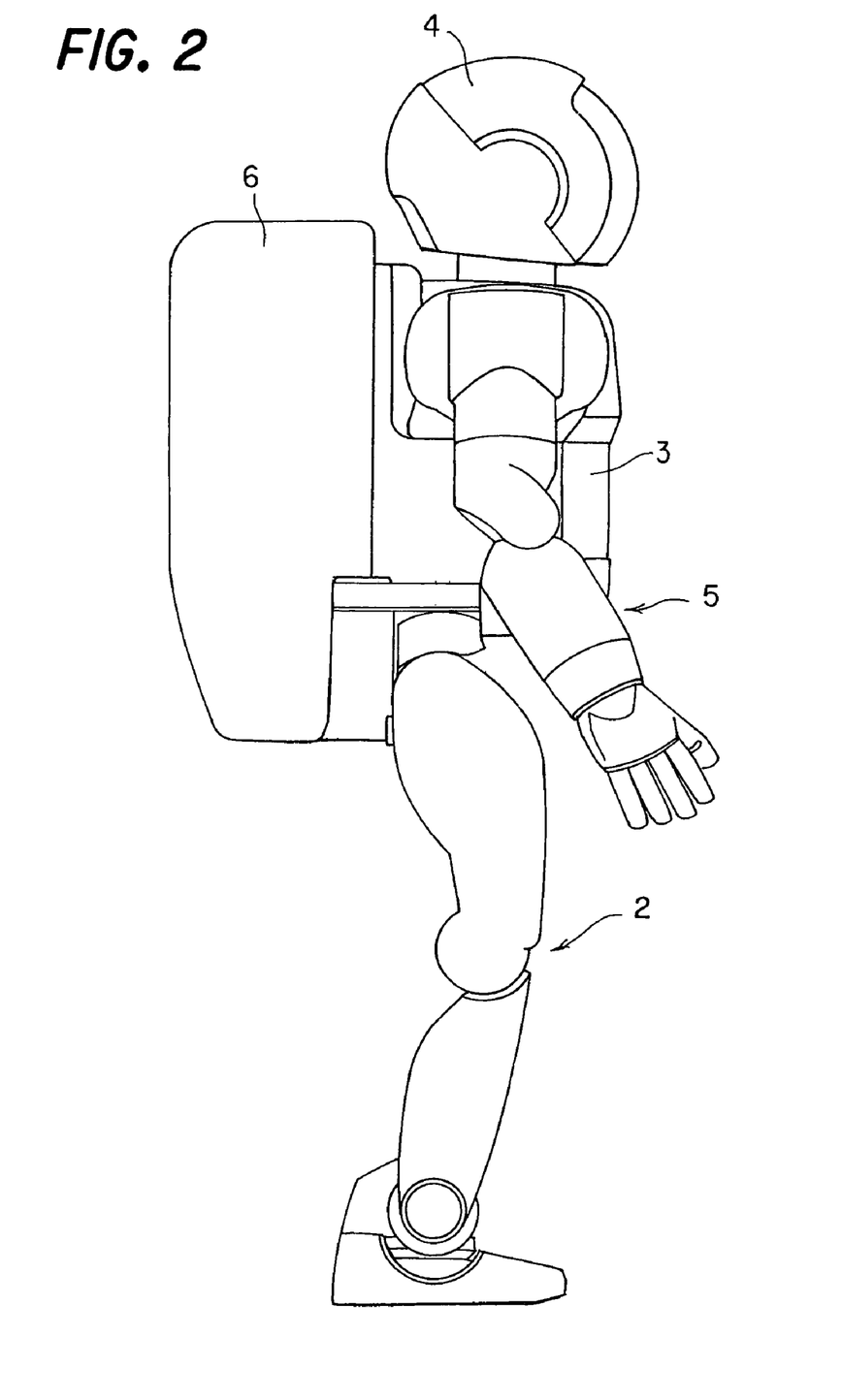
FIG. 2 is a right side view of the biped robot shown in FIG. 1.

FIG. 1 is a front view of the biped robot (hereinafter called "robot" and now assigned with reference numeral 1), and FIG. 2 is a side view thereof.

As shown in FIG. 1, the robot 1 is equipped with two legs 2, above which is provided a body (main unit) 3. A head 4 is provided at the upper part of the body 3 and two arms 5 are connected to opposite sides of the body 3. Further, as shown in FIG. 2, a housing unit 6 is provided on the back of the body 3. The housing unit 6 accommodates, among other components, a motion control ECU (electronic control unit), an image processing unit (explained later) and a battery power supply (not shown) for the electric motors that drive the joints of the robot 1. The robot 1 shown in FIGS. 1 and 2 is equipped with covers for protecting its internal structure.

The internal structure of the robot 1 will now be explained with reference to FIG. 3, focusing chiefly on the joints.

As illustrated, the right and left legs 2 of the robot 1 are each equipped with six joints, for a combined total of twelve joints, namely, joints 10R, 10L (R and L indicating the right and left sides; hereinafter the same) around the hip vertical axis (Z axis or gravity axis) for leg swiveling, roll direction (around X axis) joints 12R, 12L of a crotch (hips), pitch direction (around Y axis) joints 14R, 14L of the crotch (hips), pitch direction (around Y axis) joints 16R, 16L of knees, pitch direction (around Y axis) joints 18R, 18L of ankles, and roll direction (around X axis) joints 20R, 20L of the ankles. Feet 22R, 22L are attached to the lower ends the legs 2R(L).

Thus each leg 2 includes the crotch joints (hip joints) 10R(L), 12R(L) and 14R(L), knee joint 16R(L) and ankle joints 18R(L) and 20R(L). The crotch joints and knee joint are connected by a thigh link 24R(L) and the knee joint and ankle joints by a crus link 26R(L).

Figure 3:
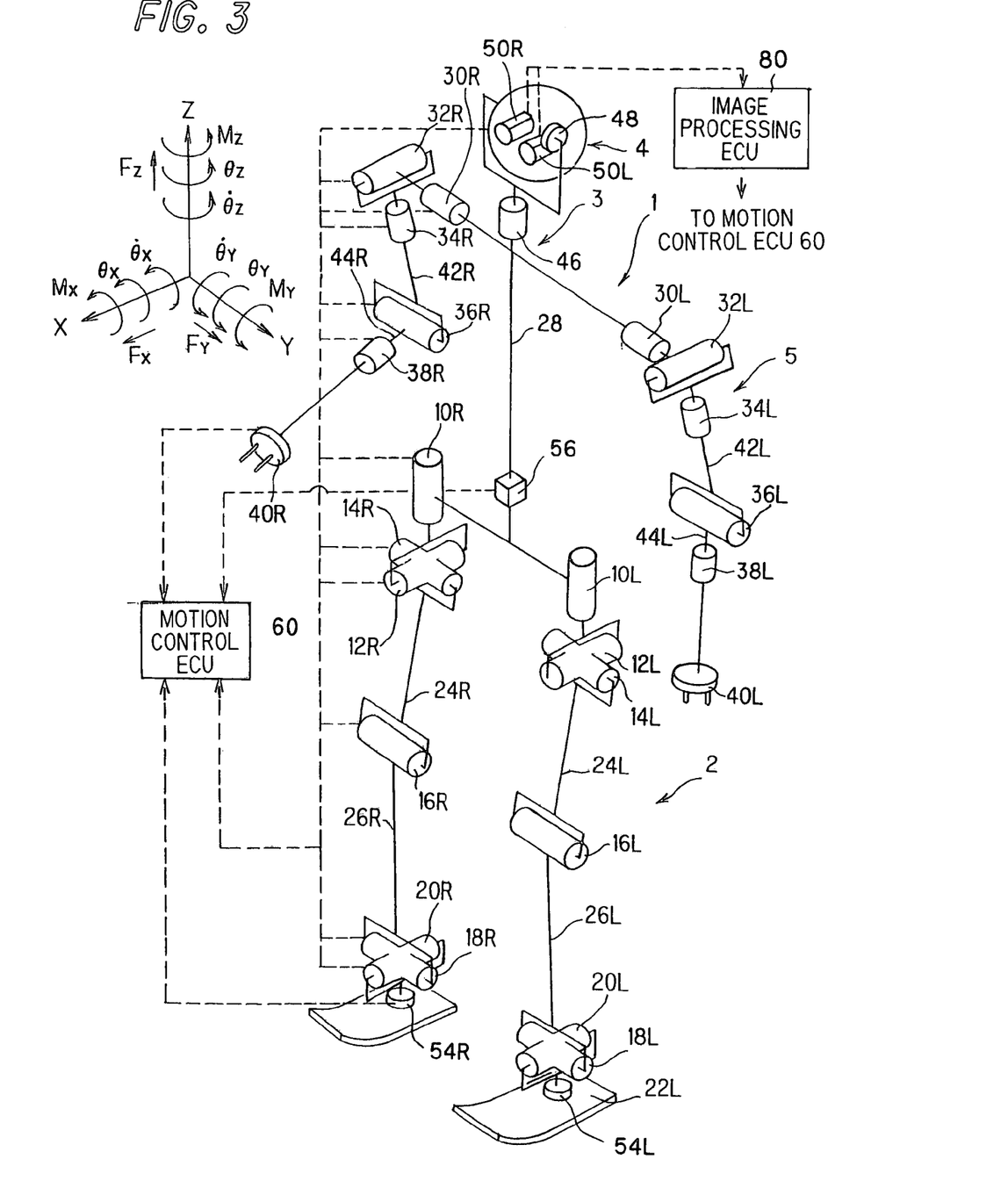
FIG. 3 is a schematic diagram showing the overall internal structure of the biped robot of FIG. 1 with focus on the joints.

The legs 2 are connected through the crotch joints to the body 3, which is represented in FIG. 3 simply by a body link 28. The arms 5 are connected to the body 3, as set out above. The arms 5 include pitch direction joints 30R, 30L of shoulders, roll direction joints 32R, 32L of the shoulders, joints 34R, 34L around the vertical axis for arm swiveling, joints 36R, 36L around the pitch axis of elbows, and joints 38R, 38L around the vertical axis for wrist swiveling. Hands (end effectors) 40R, 40L are attached to the distal ends of the wrists.

Thus each arm 5 includes the shoulder joints 30R(L), 32R(L), 34R(L), the elbow joint 36R(L) and the wrist joint 38R(L). Further, the shoulder joints and the elbow joint are connected by an upper arm link 42R(L) and the elbow joint and the hand by a forearm link 44R(L).

The head 4 includes a neck joint 46 around a vertical axis and a head rotation mechanism 48 for rotating the head 4 around an axis perpendicular thereto. Two CCD cameras (imaging means) 50R(L) are mounted laterally in parallel inside the head 4 so as to produce stereoscopic (binocular) images. The color image obtained from each CCD camera 50R(L) is sent to the image processing ECU (now assigned with reference numeral 80), which is constituted as a microcomputer and uses it to perform moving object detection processing as explained in detail later. Each CCD camera 50R(L) has a 320×240 pixel matrix and a field of vision measuring 60 degrees horizontally and 40 degrees vertically.

Owing to the foregoing configuration, the right and left legs 2 of the robot 1 are imparted with a total of twelve degrees of freedom, so that during locomotion the legs as a whole can be imparted with desired movements by driving the twelve joints to appropriate angles to enable desired walking in three-dimensional space. Further, the left and right arms 5 are each given five degrees of freedom, so that desired operations can be carried out by driving these joints to appropriate angles.

A conventional six-axis force sensor 54R(L) is attached to the foot member 22R(L) below the ankle joint and, of the external forces acting on the robot, detects and outputs signals representing the floor reaction force components Fx, Fy and Fz of three directions and the moment components Mx, My and Mz of three directions acting on the robot from the surface of contact. In addition, an inclination sensor 56 installed on the body 3 outputs a signal representing inclination relative to vertical and the angular velocity thereof. And, encoders (not shown) installed adjacent to the electric motors (not shown) at the respective joints output signals representing the amount of rotation of the associated joints.

The outputs of the sensors including the six-axis force sensor 54R(L) and the output of the image processing ECU 80 are sent to the motion control ECU (now assigned with reference numeral 60). The motion control ECU 60 includes a microcomputer and based on data stored in a ROM (not shown) and the various outputs of the sensors and the image processing unit 80, computes control values (manipulated variables) of the electric motors needed for controlling the motion of the robot 1, more specifically, for driving the joints of the robot 1 and outputs them to the motors through a D/A converter and amplifiers (neither shown).

Figure 4:
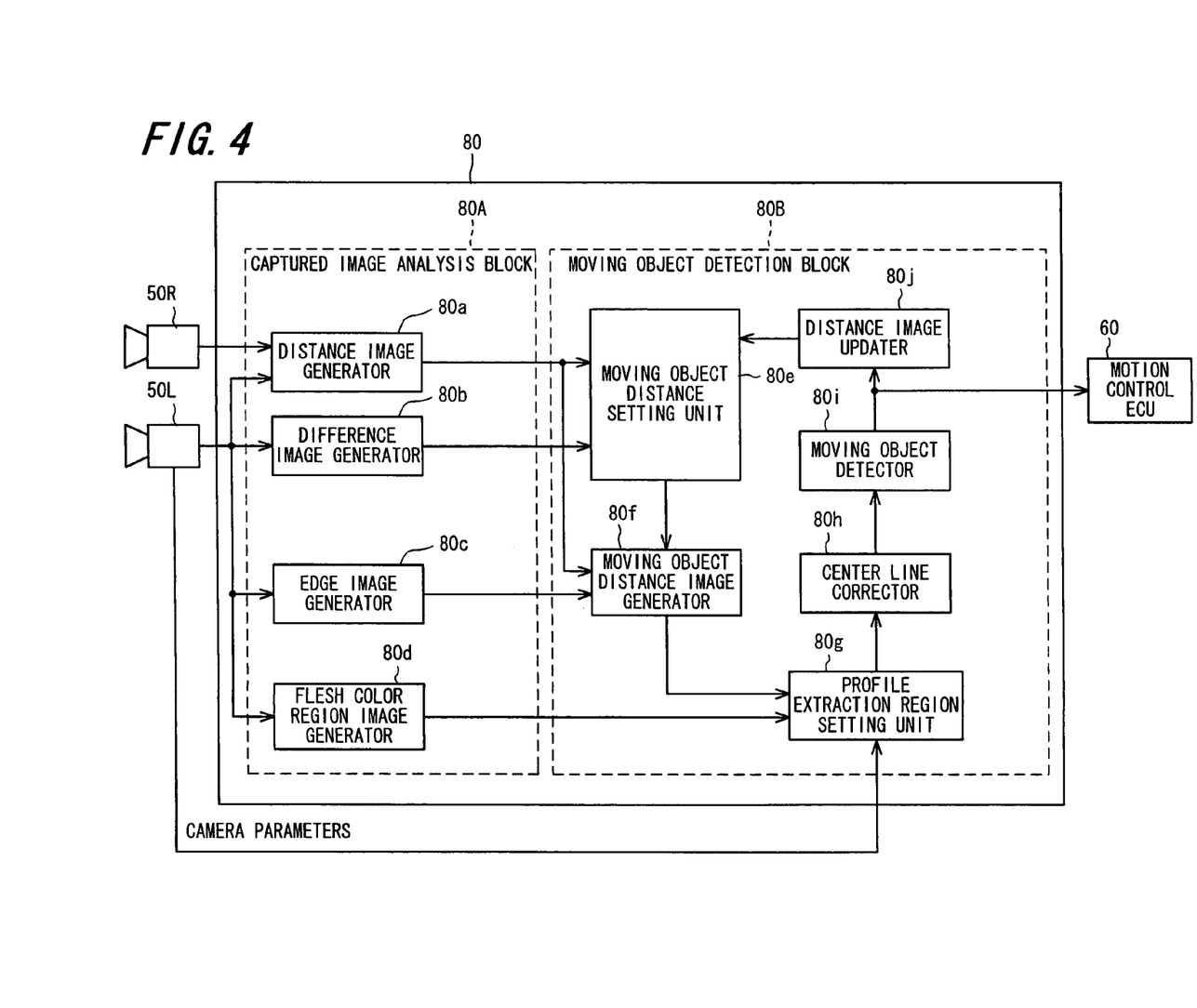
FIG. 4 is a block diagram showing the configuration and the operation of an image processing ECU (electronic control unit) illustrated in FIG. 3.

FIG. 4 is a block diagram showing the configuration and the operation of the image processing ECU 80 in a functional manner.

The configuration and structure of the image processing ECU 80 will now be explained with reference to this figure.

As shown, the operation of the image processing CPU 80 includes a captured image analysis block 80A for analyzing images captured by or inputted from the right and left CCD cameras 50R and 50L, and a moving object detection block 80B for utilizing the analyzed images to detect any moving object present.

The captured image analysis block 80A is composed of a distance image generator 80a, a difference image generator 80b, an edge image generator 80c and a flesh color region image generator 80d.

The distance image generator 80a utilizes the parallax of two images captured or taken simultaneously by the left-side CCD camera 50L and right-side camera 5OR to generate a distance image DeI indicating the distance (depthwise) from the robot 1 to the imaged object. Specifically, the distance image generator 80a uses the left-side CCD camera 50L as the reference camera, performs block matching of the image taken by the reference left-side CCD camera 50L (called "basic image BI") and the image captured or taken at the same time point by the right-side camera 5OR (called "simultaneous image") in blocks of a predetermined size (e.g., 16×16 pixels), measures the parallax relative to the basic image, and associates the magnitude of the measured parallax (amount of parallax) with the pixels of the basic image to generate the distance image DeI. Larger parallax means that the CCD cameras 50R(L) are closer to the imaged object and smaller parallax means that they are farther from it.

Figure 5:
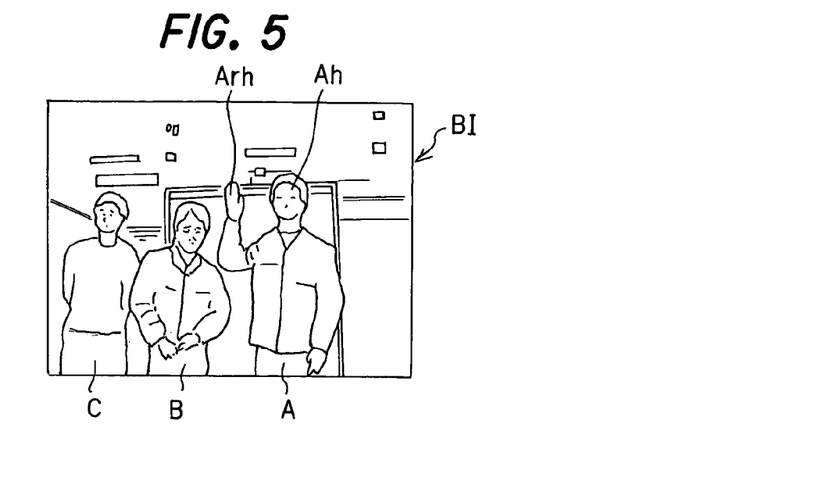
FIG. 5 is an explanatory view showing a basic image taken by the left-side CCD camera shown in FIG. 4.

FIG. 5 shows a basic image BI taken by the left-side CCD camera 50L. The explanation that follows is based on this image of three persons. The person on the right (from the viewpoint of the observer) in basic image BI is designated person A, the person in the middle, person B, and the person on the left, person C. Person A has his right hand Arh raised to the right side of his head Ah. In real space, person A and person B are standing at positions 1.63 m away from the CCD cameras 50R(L) and person C is standing at a position 1.96 m away from the CCD cameras 50R(L).

Figure 6:
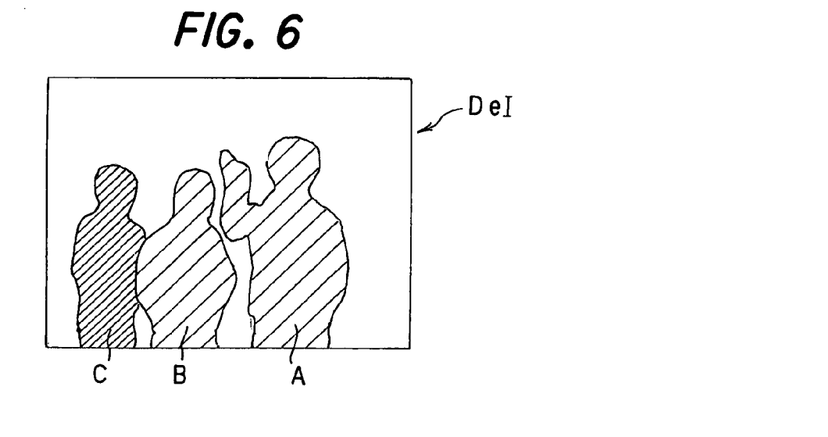
FIG. 6 is an explanatory view showing a distance image generated by a distance image generator illustrated in FIG. 4.

FIG. 6 shows the distance image DeI generated by the distance image generator 80a. The pixel values of the distance image DeI are expressed as parallax so that, as can be seen in FIG. 6, the image is brighter nearer the CCD cameras 50R(L) (persons A and B) and darker farther from the CCD cameras 50R(L) (person C). For ease of understanding, this difference in image lightness/darkness is represented in FIG. 6 as difference in hatching line spacing. That is, in FIG. 6, brighter (nearer) regions are represented by more widely spaced hatching and darker (more distant) regions by more narrowly spaced hatching. The black spots are objects far from persons A, B and C (where parallax is small).

The difference image generator 80b in FIG. 4 calculates the difference between two basic images BI sequentially captured by the left-side CCD camera 50L and uses the result to generate a difference image DiI. Specifically, the difference image generator 80b calculates the difference between two basic images BI captured or taken sequentially by the left-side CCD camera 50L (at time t and time t+Δt), assigns pixels in which a difference occurred a pixel value of 1 on the presumption that they are pixels where motion occurred and assigns pixels in which no difference occurred a pixel value of 0 on the presumption that they are pixels where no motion occurred, thereby generating the difference image DiI. The difference image generator 80b eliminates noise from the generated difference image DiI by subjecting it to appropriate file processing such as median filter processing. Moreover, when movement of the robot 1 between time t and time t+Δt causes a change in the background of the basic image BI, the basic image BI captured at time t+Δt is corrected based on the distance that the CCD camera 50L moved so as to detect only the difference caused by movement of the moving objects.

Figure 7:
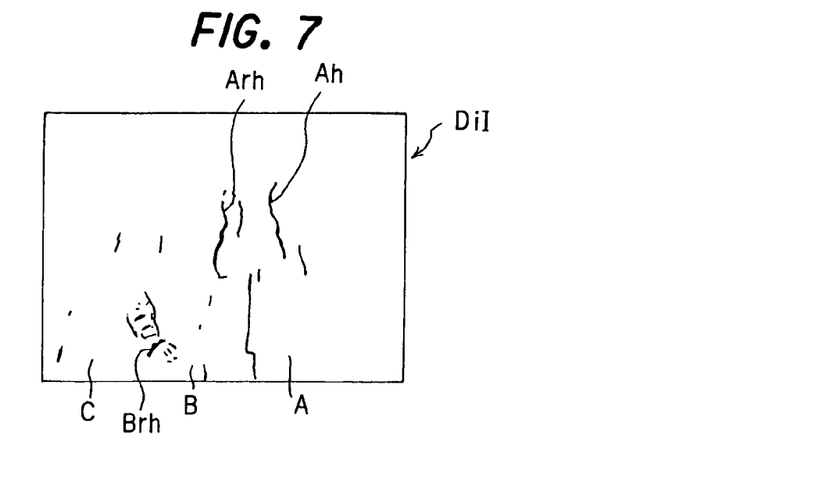
FIG. 7 is an explanatory view showing a difference image generated by a difference image generator illustrated in FIG. 4.

FIG. 7 shows the difference image DiI generated by the difference image generator 80b. The black regions in this figure are ones assigned a pixel value of 1, i.e., are ones whose pixels experienced movement. The white regions are ones assigned a pixel value of 0, i.e., ones whose pixels did not experience movement. FIG. 7 therefore shows that the right hand Arh and head Ah of person A and the right hand Brh of person Bmoved most between time t and time Δt.

The edge image generator 80c in FIG. 4 utilizes the basic image BI captured by the left-side CCD camera 50L to generate an edge image EI. Specifically, the edge image generator 80c detects or extracts edge pixels defined as pixels where the change in brightness in the basic image BI is equal to or greater than a predetermined level and generates an edge image EI composed solely of the detected edges. To be still specific, the edge detection is carried out by applying an operator (e.g., a Sovel operator) having a prescribed weighting coefficient to the whole image, calculating the product of the corresponding pixel brightness values, and detecting as edges the line segments whose difference from adjacent segments is equal to or greater than a prescribed value in row or column units.

Figure 8:
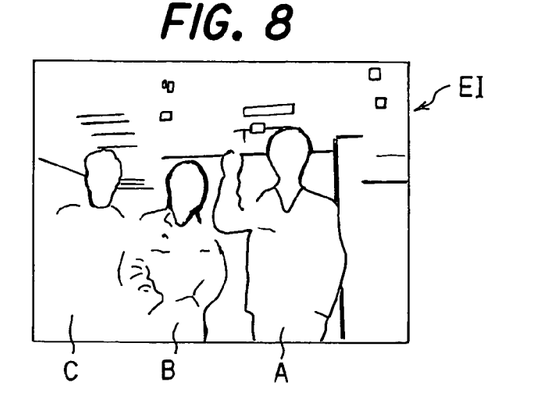
FIG. 8 is an explanatory view showing an edge image generated by an edge image generator illustrated in FIG. 4.

FIG. 8 shows the edge image EI generated by the edge image generator 80c. Boundaries of the background features and each of persons A, B and C have been detected as edges.

The flesh color region image generator 80d in FIG. 4 extracts flesh color regions from the basic image BI captured by the left-side CCD camera 50L and uses them to generate a flesh color region image CI. Specifically, the flesh color region image generator 80d transforms the basic image BI from RGB (Red, Green, Blue) value to HLS (Hue, Luminance, Saturation) space, assigns a value of 1 to pixels whose hue, luminance and saturation all exceed predefined thresholds related to flesh color on the presumption that they are pixels exhibiting flesh color, and assigns a value of 0 to other pixels on the presumption that they are pixels exhibiting colors other than flesh color, thereby generating the flesh color region image CI. The flesh color region image generator 80d eliminates noise from the generated flesh color region image CI by subjecting it to appropriate filter processing such as median filter processing.

Figure 9:
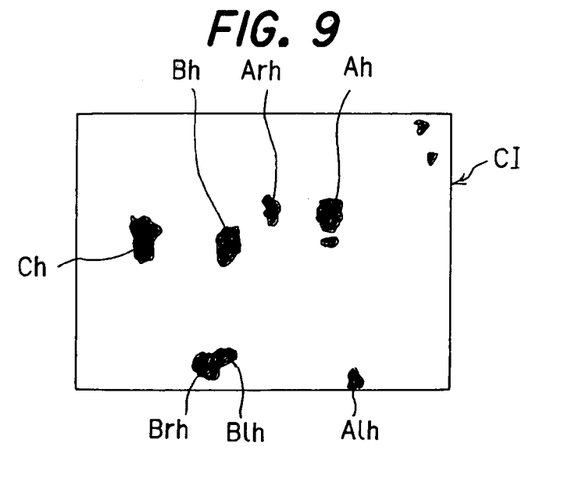
FIG. 9 is an explanatory view showing a flesh color region image generated by a flesh color region image generator illustrated in FIG. 4.

FIG. 9 shows the flesh color region image CI generated by the flesh color region image generator 80d. The black regions in this figure are ones assigned a pixel value of 1, i.e., regions composed of pixels exhibiting flesh color. The white regions are ones assigned a pixel value of 0, i.e., regions composed of pixels of colors other than flesh color. It can be seen that flesh color portions of persons A, B and C, namely, their heads (faces) Ah, Bh and Ch, the right hands (palms) Arh, Brh of persons A and B, and the left hands (palms) Alh, Blh of persons A and B, were extracted from the basic image BI as flesh color regions. The hands of person C were not extracted as flesh color regions because, as shown in FIG. 5, person C has his hands clasped behind.

The moving object detection block 80B in FIG. 4 is composed of a moving object distance setting unit 80e, a moving object distance image generator 80f, a profile extraction region setting unit 80g, a center line corrector 80h, a moving object detector 80i and a distance image updater 80j.

The moving object distance setting unit 80e utilizes the aforesaid distance image DeI and difference image DiI to define or set the distance to the position where the moving object (one of persons A, B, C) is estimated to be present ("moving object distance"). Specifically, for every parallax (distance) represented by the distance image DeI, the moving object distance setting unit 80e sums the number of pixels of the difference image DiI at the position corresponding to the parallax, presumes the moving object to be present at the parallax (distance) where the sum is maximum, and defines it as the moving object distance.

In the difference image shown in FIG. 7, the right hand Arh and head Ah of person A and the right hand Brh of person B moved most, so in the distance image DeI shown in FIG. 6 the parallax representing a distance of 1.63 m from the CCD cameras 50R(L) is defined as the moving object distance. The moving object distance setting unit 80e stores the captured or inputted distance image DeI and difference image DiI in the RAM (not shown) of the image processing ECU 80.

The moving object distance defined by the moving object distance setting unit 80e of FIG. 4 is outputted to the moving object distance image generator 80f. The moving object distance image generator 80f extracts the pixels corresponding to the moving object distance from the edge image EI and generates a moving object distance image TDeI.

Figure 10:
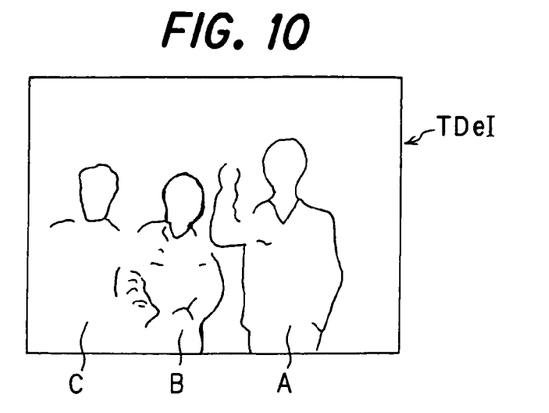
FIG. 10 is an explanatory view showing a moving object distance image generated by a moving object distance image generator illustrated in FIG. 4.

Specifically, the moving object distance image generator 80f defines the parallax range (depth) of moving object distance ±α as the parallax range in which the moving object with the largest movement is present. The value of α here is set at 0.5 m, for example, when the moving object is presumed to be a person. Therefore, as shown in FIG. 10, the edges extracted into the moving object distance image TDeI include not only those of persons A and B but also edges of person C positioned 0.33 m behind persons A and B. On the other hand, edges of background features beyond this distance are eliminated.

The moving object distance image TDeI generated by the moving object distance image generator 80f is sent to the profile extraction region setting unit 80g. The profile extraction region setting unit 80g sums the number of pixels in the moving object distance image TDeI to produce a histogram, defines the position where the summed number of pixels is greatest as a center line, and defines in the moving object distance image TDeI the profile extraction region where extraction of the moving object profile is to be conducted.

Figure 11:
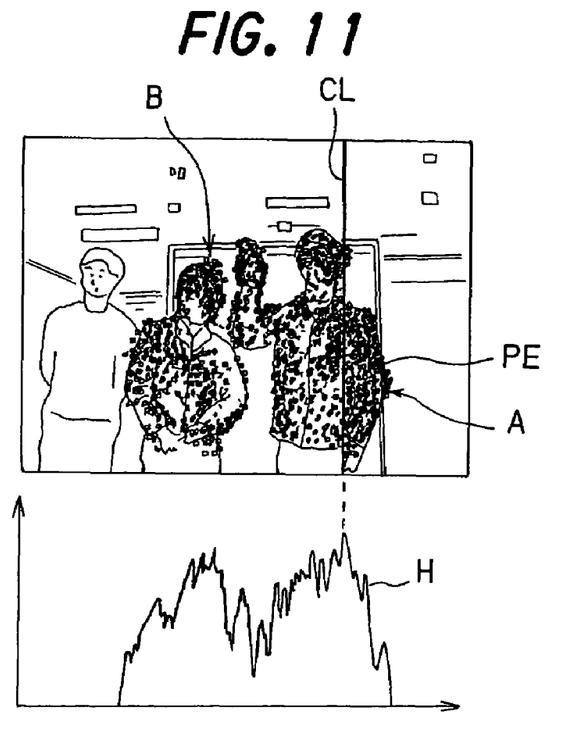
FIG. 11 is an explanatory view showing a histogram and a center line defined by the profile extraction region setting unit illustrated in FIG. 4.

Specifically, the profile extraction region setting unit 80g sums the number of pixels in the vertical direction of the moving object distance image TDeI generated by the moving object distance image generator 80f to produce a histogram. FIG. 11 shows the pixels in the vertical direction of the moving object distance image TDeI (symbol PE) and the histogram produced (designated by symbol H). In FIG. 11 (and also in FIGS. 12 and 13 discussed below), the basic image BI shown in FIG. 5 is superimposed behind the pixels PE for ease of understanding.

Figure 12:
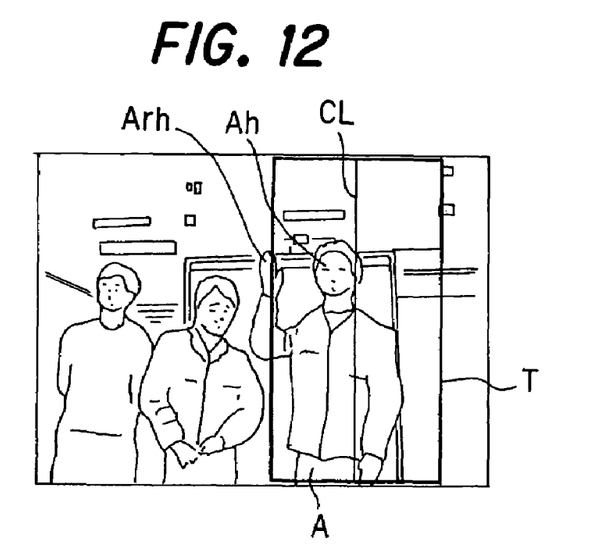
FIG. 12 is an explanatory view showing a profile extraction region set by a profile extraction region setting unit illustrated in FIG. 4.

The profile extraction region setting unit 80g further defines the position where the produced histogram H is greatest as the center line CL. Then, as shown in FIG. 12, it defines a profile extraction region T centered on the so-defined center line CL in which extraction of the moving object profile is to be conducted as will be explained later. More specifically, the profile extraction region T is defined to have a predetermined horizontal length (width) centered on the center line CL and to have a predetermined vertical length (height).

In the case where the moving object turns out to include two adjacent moving objects (persons A and B), therefore, profile extraction can be carried out after separating the individual moving objects. When the moving object is presumed to be a person, the predetermined horizontal length is set to around the breadth of a person's shoulders, e.g., to 0.5 m. The length in the vertical direction is set based on the distance to the moving object and certain camera parameters (including, for example, the pan and tilt angles of the CCD cameras 50R(L)) so as to enable thorough coverage of the moving object. When the moving object is presumed to be a person, it is set to 2.0 m, for example.

The position where the histogram H is greatest is defined as the center of the profile extraction region T because this can be considered where the center of the moving object is located. (Explained with reference to FIG. 12, this would mean the position where the head Ah of person A is located.) Owing to the fact that the moving object distance image TDeI is generated based on the edge image EI, however, many pixels are present near the boundary.

Therefore, as shown in FIG. 12, the position where the histogram H is greatest, i.e., the center line CL, may be shifted away from the center of the head (head Ah of person A) toward one edge. Since the profile extraction region T is given a size matched to the moving object to be detected, a shift of the center line CL away from the center of the moving object results in part of the moving object being projected outside the profile extraction region T (as is the right hand Arh of person A in FIG. 12). This makes accurate detection of the moving object difficult. Although the whole of the moving object can be fit in the region by expanding the profile extraction region T, this solution is best avoided because the need to carry out profile extraction of the moving object in the expanded profile extraction region T might substantially increase the processing load.

In this embodiment, therefore, the center line CL defined by the profile extraction region setting unit 80g is corrected so that the profile extraction region T assumes a suitable position.

The center line CL and profile extraction region T defined by the profile extraction region setting unit 80g of FIG. 4 are sent to the center line corrector 80h, which utilizes the edge image EI to correct the center line CL position and the profile extraction region T.

Specifically, the center line corrector 80h is supplied with the moving object distance image TDeI whose edge image EI, center line CL and profile extraction region T have been defined, overlays the edge image EI and moving object distance image TDeI, and corrects the center line CL.

As the edge image EI coincides well with the outline of the moving object, the center line CL can be accurately positioned at the center of the moving object by correcting the center line CL to the position where the peak of the edge image EI appears in the vertical direction (i.e., to the center of the head where the highest point of the moving object is present).

However, the edge image EI may include multiple peaks, such as when a person (e.g., person A in FIG. 8) raises his/her hand to a height near that of the head, so that a question may arise regarding which of the multiple peaks should be recognized as the head.

The center line corrector 80h is therefore configured to receive the flesh color region image CI generated by the flesh color region image generator 80d, compare the received flesh color region image CI with a plurality of flesh color region patterns stored in a database DB (shown in FIG. 13) to find the best match pattern, and determine which peak of the edge image should be recognized as the head in accordance with the best match pattern. The database DB is stored in the ROM (not shown) of the image processing ECU 80.

Figure 13:
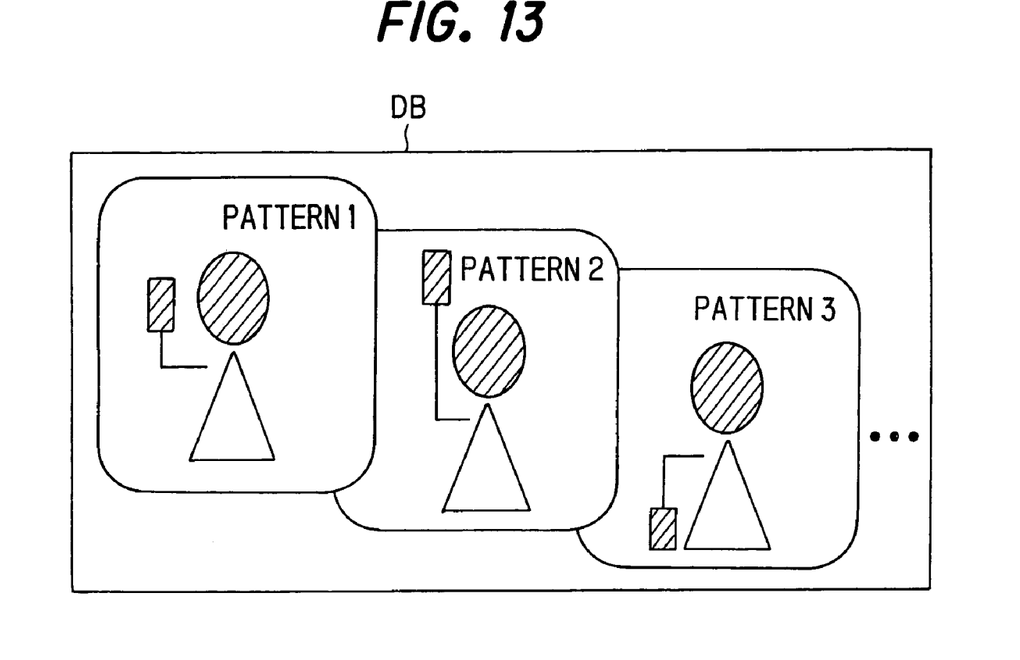
FIG. 13 is an explanatory view showing a database used by a center line corrector illustrated in FIG. 4.

To amplify on the foregoing, the database DB includes multiple patterns like those shown in FIG. 13 each representing a spatial arrangement of flesh color regions (shown as hatched regions) corresponding to head (face) and hand (palm or back) regions. The stored flesh colored region patterns include, for instance, one with a hand positioned at the side of the head (pattern 1), one with a hand raised above the head (pattern 2), one with a hand extended for a handshake (pattern 3), and the like. The center line corrector 80h compares the flesh color region image CI with these patterns and selects the most similar among them, whereby it can discriminate which of the flesh colored regions in the flesh color region image CI represents the head. Obviously, the patterns stored in the database DB need to be appropriately adjusted in accordance with the moving object distance defined by the moving object distance setting unit 80e.

Figure 14:
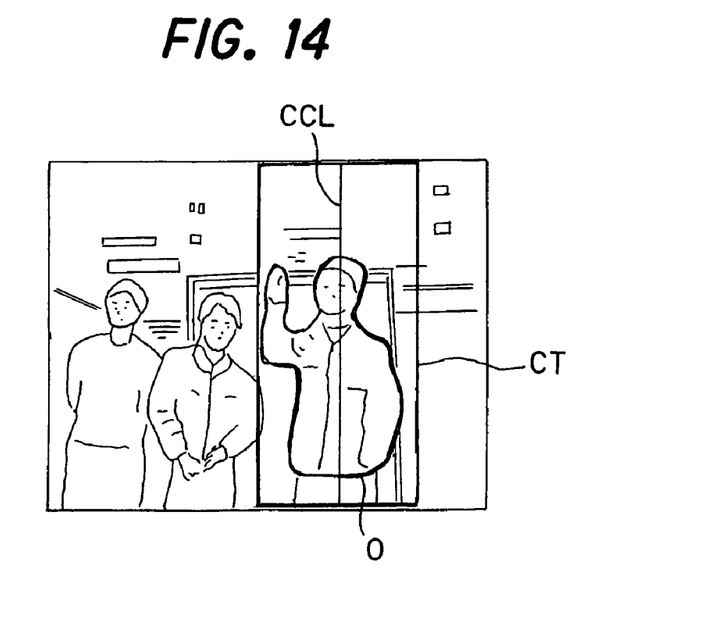
FIG. 14 is an explanatory view showing a center line and a profile extraction region corrected by the center line corrector illustrated in FIG. 4.

The center line corrector 80h then positions (corrects) the center line CL of the profile extraction region T to the peak of the edge image EI that corresponds to the flesh colored region recognized as the head in the flesh color region image CI. Thus, the center line CL can be accurately positioned at the center of the moving object even when multiple peaks are present in the edge image EI. FIG. 14 shows the corrected center line CCL and the corrected profile extraction region CT.

As indicated in FIG. 4, the corrected center line CCL and corrected profile extraction region CT defined by the center line corrector 80h are sent to the moving object detector 80i.

The moving object detector 80i detects the moving object (person A) in the corrected profile extraction region CT by using known active profile models (called "snakes") to extract the moving object profile (designated by symbol O in FIG. 14). Further, as shown in FIG. 14, the center of gravity of the moving object (center of gravity of the internal region including the profile O) is calculated, whereafter the distance between the center of gravity of the moving object and the robot 1 (relative distance) m and the direction (relative angle) deg are calculated.

The moving object profile O extracted by the moving object detector 80i and the distance from the robot 1 to the center of gravity of the moving object and direction of the moving object calculated thereby are sent to the motion control ECU 60 as moving object information. If needed, the motion control ECU 60 operates the electric motors of the robot 1 to stop the motion (walking) or to avoid the moving object. The technique used to generate the gait of the robot 1 will not be set out here because it is described in detail in the assignee's Japanese Laid-Open Patent Application No. 2002-326173.

The moving object information is also sent to the distance image updater 80j. The distance image updater 80j utilizes the moving object information produced by the moving object detector 80i to update the distance image DeI stored by the moving object distance setting unit 80e.

Specifically, it sets the pixel value of the distance image DeI corresponding to the internal region including the profile O to 0. In other words, after extraction of the moving object profile has been completed, the region where the moving object is present is deleted. Once the distance image updater 80j has updated the distance image DeI, it sends the information to the moving object distance setting unit 80e as updated information. Thus by continuing the forgoing moving object detection processing, person B and person C can be individually detected as moving objects in the next and following processing cycles.

As explained in the foregoing, this embodiment is configured to have a system for detect a moving object (such as person A, B and C), comprising: a plurality of cameras (the CCD cameras 50R(L)) capturing stereoscopic image successively in time series; distance image generator 80a inputting the images captured in time series and generating a distance image DeI indicative of a distance to an imaged object based on a parallax of the inputted images (more specifically, the parallax of the basic image BI captured by the left CCD camera 50L and the image captured simultaneously by the right CCD camera 50R); difference image generator 80b inputting the images captured in time series (t, t+Δt) and generating a difference image DiI between the inputted images (the basic image BI); edge image generator 80c inputting the images captured in time series and generating an edge image EI by extracting pixels where change in brightness is equal to or greater than a predetermined level; moving object distance setting unit 80e inputting the generated distance image and the difference image and setting a moving object distance indicative of a distance to a position where the moving object is estimated to be present, based on the inputted distance image DeI and the difference image DiI; moving object distance image generator 80f inputting at least the generated edge image and the set moving object distance and generating a moving object distance image TDeI by extracting pixels corresponding to the set moving object distance from the generated edge image EI; profile extraction region setting unit 80g inputting at least the generated moving object distance image and summing number of pixels in the inputted moving object distance image TDeI to set a profile extraction region T, where extraction of the moving object is to be conducted, in the generated moving object distance image by defining a position, where the summed number of pixels is greatest, as its center line CL; center line corrector 80h inputting at least the edge image and the defined center line CL of the profile extraction region T and correcting the center line of the profile extraction region based on the inputted edge image; and moving object detector 80i inputting the profile extraction region T whose center line CL is corrected and extracting a profile O of the moving object (the profile of the person A) in the inputted profile extraction region T to detect the moving object.

With this, since the profile extraction of the moving object is restricted to a region where each moving object is present, it becomes possible to detect the moving objects respectively even when the two or more objects are present in neighborhood. Further, the center line CL is corrected by the edge image EI, more specifically, the center line CL is positioned at the peak of the edge image EI well corresponding to the moving object profile, even when the center of the moving object is out of the position where the summed number of pixels is greatest, it becomes possible to capture each moving object in the corrected profile extraction region, thereby enabling to detect each moving object even when two or more objects exist in neighborhood.

In the system, the profile extraction region setting unit 80g sums the number of pixels in the inputted moving object distance image TDeI to produce a histogram H and defines, as the center line CL, the position where as the histogram is greatest.

The system further includes: color region image generator (flesh color region generator) 80d inputting the images captured in time series and generating a color region image (flesh color region image CI) by extracting a predetermined color from the inputted image (basic image BI); and a data base DB storing a plurality of color region patterns (patterns 1 to 3); and the center line corrector 80h compares the generated color region image with the stored color region patterns and corrects the center line CL based on a best match pattern. With this, even when the edge image EI has peaks, since the peak (at which the center line CL should be located) can accurately be positioned at the center of the moving object, each moving object can be detected accurately even when two or more objects exist in neighborhood.

In the system, the predetermined color is a flesh color. The moving object detector 80i extracts the profile O of the moving object by using an active profile model (snake), and the moving object is a human being (A, B and C).

It should be noted that the moving object includes a living thing like a human being and non-living thing like a vehicle. The moving object also includes not only a whole part or portion of the thing, but also a part or portion of the thing (e.g., an arm or leg of the human being).

It should also be noted that the predetermined distance is not limited to the distance of 0.9 m used as an example in the foregoing but can be one appropriately defined in accordance with the robot step length and maximum walking speed (the predetermined condition), the CPU performance and other factors.

It should further be noted that, although the predetermined speed is defined with reference to the condition when the robot 1 is walking at its maximum walking speed, the predetermined speed can instead be defined to also take into account cases in which the moving object itself is approaching the robot. By this is meant that the predetermined speed can be defined based on the sum of the robot walking speed and the moving object travel speed in the direction of the robot. For this reason, the above is described using the phrase "the speed of the moving object relative to the robot."

Moreover, it is possible to cope with the fact that the travel speed of the moving object in the direction of the robot is not necessarily uniform by changing the predetermined distance as a function of the relative speed between the robot and the moving object. The travel speed of the moving object can be calculated by, for example, finding the difference between moving object information calculated at time t and moving object information calculated at time t+Δt. With respect to an object or obstacle that is not a moving object but a stationary object, it suffices to determine whether or not to stop robot walking based on the distance to the stationary object and the walking speed of the robot 1.

While it was explained that a flesh color region image CI is generated by extracting flesh colored regions from the basic image BI, the color used to identify the moving object need not necessarily be flesh color and it is possible to use any color that enables recognition of a moving object feature (particularly an attitude feature).

Japanese Patent Application No. 2003-095483, filed on Mar. 31, 2003, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for detect a moving object, comprising:
   a plurality of cameras capturing stereoscopic image successively in time series;
   distance image generator inputting the images captured in time series and generating a distance image indicative of a distance to an imaged object based on a parallax of the inputted images;
   difference image generator inputting the images captured in time series and generating a difference image between the inputted images;
   edge image generator inputting the images captured in time series and generating an edge image by extracting pixels where change in brightness is equal to or greater than a predetermined level;
   moving object distance setting unit inputting the generated distance image and the difference image and setting a moving object distance indicative of a distance to a position where the moving object is estimated to be present, based on the inputted distance image and the difference image;
   moving object distance image generator inputting at least the generated edge image and the set moving object distance and generating a moving object distance image by extracting pixels corresponding to the set moving object distance from the generated edge image;
   profile extraction region setting unit inputting at least the generated moving object distance image and summing number of pixels in the inputted moving object distance image to set a profile extraction region, where extraction of the moving object is to be conducted, in the generated moving object distance image by defining a position, where the summed number of pixels is greatest, as its center line;
   center line corrector inputting at least the edge image and the defined center line of the profile extraction region and correcting the center line of the profile extraction region based on the inputted edge image; and
   moving object detector inputting the profile extraction region whose center line is corrected and extracting a profile of the moving object in the inputted profile extraction region to detect the moving object.

2. The system according to claim 1, wherein the profile extraction region setting unit sums the number of pixels in the inputted moving object distance image to produce a histogram and defines, as the center line, the position where as the histogram is greatest.

3. The system according to claim 1, further including:
   color region image generator inputting the images captured in time series and generating a color region image by extracting a predetermined color from the inputted image; and
   a data base storing a plurality of color region patterns;
   and the center line corrector compares the generated color region image with the stored color region patterns and corrects the center line based on a best match pattern.

4. The system according to claim 3, wherein the predetermined color is a flesh color.

5. The system according to claim 1, wherein the moving object detector extracts the profile of the moving object by using an active profile model.

6. The system according to claim 1, wherein the moving object is a human being.

7. A method of detect a moving object, comprising the steps of:
   capturing stereoscopic image successively in time series;
   inputting the images captured in time series and generating a distance image indicative of a distance to an imaged object based on a parallax of the inputted images;
   inputting the images captured in time series and generating a difference image between the inputted images;
   inputting the images captured in time series and generating an edge image by extracting pixels where change in brightness is equal to or greater than a predetermined level;
   inputting the generated distance image and the difference image and setting a moving object distance indicative of a distance to a position where the moving object is estimated to be present, based on the inputted distance image and the difference image;
   inputting at least the generated edge image and the set moving object distance and generating a moving object distance image by extracting pixels corresponding to the set moving object distance from the generated edge image;
   inputting at least the generated moving object distance image and summing number of pixels in the inputted moving object distance image to set a profile extraction region, where extraction of the moving object is to be conducted, in the generated moving object distance image by defining a position, where the summed number of pixels is greatest, as its center line;
   inputting at least the edge image and the defined center line of the profile extraction region and correcting the center line of the profile extraction region based on the inputted edge image; and
   inputting the profile extraction region whose center line is corrected and extracting a profile of the moving object in the inputted profile extraction region to detect the moving object.

8. The method according to claim 7, wherein the step of profile extraction region setting sums the number of pixels in the inputted moving object distance image to produce a histogram and defines, as the center line, the position where as the histogram is greatest.

9. The method according to claim 7, further including the steps of:
   inputting the images captured in time series and generating a color region image by extracting a predetermined color from the inputted image; and
   storing a plurality of color region patterns;
   and the step of center line correction compares the generated color region image with the stored color region patterns and corrects the center line based on a best match pattern.

10. The method according to claim 9, wherein the predetermined color is a flesh color.

11. The method according to claim 7, wherein the step of moving object detection extracts the profile of the moving object by using an active profile model.

12. The method according to claim 7, wherein the moving object is a human being.

* * * * *

UNITED STATES PATENT AND TRADEMARK OFFICE
CERTIFICATE OF CORRECTION

PATENT NO. : 7,254,253 B2  
APPLICATION NO. : 10/808327  
DATED : August 7, 2007  
INVENTOR(S) : Higaki et al.

Page 1 of 1

It is certified that error appears in the above-identified patent and that said Letters Patent is hereby corrected as shown below:

Section 11, column 1

Claim 1, line 1, change "detect" to --detecting--

Signed and Sealed this

Twenty-second Day of January, 2008

JON W. DUDAS  
*Director of the United States Patent and Trademark Office*

UNITED STATES PATENT AND TRADEMARK OFFICE
CERTIFICATE OF CORRECTION

PATENT NO. : 7,254,253 B2  Page 1 of 1
APPLICATION NO. : 10/808327
DATED : August 7, 2007
INVENTOR(S) : Higaki et al.

It is certified that error appears in the above-identified patent and that said Letters Patent is hereby corrected as shown below:

Column 11

Claim 1, line 10, change "detect" to --detecting--

This certificate supersedes the Certificate of Correction issued January 22, 2008.

Signed and Sealed this

Nineteenth Day of February, 2008

JON W. DUDAS
*Director of the United States Patent and Trademark Office*